(12) United States Patent
Ansari et al.

(10) Patent No.: US 8,040,802 B2
(45) Date of Patent: Oct. 18, 2011

(54) METHOD OF CONTROLLING CONGESTION FOR WIRELESS COMMUNICATIONS

(75) Inventors: Nirwan Ansari, Montville, NJ (US); Shupeng Li, Piscataway, NJ (US); Ashok N. Rudrapatna, Basking Ridge, NJ (US)

(73) Assignee: Alcatel Lucent, Paris (FR)

( * ) Notice: Subject to any disclaimer, the term of this patent is extended or adjusted under 35 U.S.C. 154(b) by 454 days.

(21) Appl. No.: 12/013,587

(22) Filed: Jan. 14, 2008

(65) Prior Publication Data
US 2009/0180384 A1 Jul. 16, 2009

(51) Int. Cl.
*H04L 12/26* (2006.01)
(52) U.S. Cl. ........................................ 370/231; 370/236
(58) Field of Classification Search ........... 370/229–238
See application file for complete search history.

(56) References Cited

U.S. PATENT DOCUMENTS

| | | | |
|---|---|---|---|
| 6,169,892 B1* | 1/2001 | Sollee | 455/411 |
| 6,501,732 B1* | 12/2002 | Xu et al. | 370/235 |
| 2006/0262723 A1* | 11/2006 | Velev et al. | 370/235 |
| 2007/0070931 A1* | 3/2007 | Lewis et al. | 370/328 |
| 2008/0114887 A1* | 5/2008 | Bryers et al. | 709/230 |

* cited by examiner

*Primary Examiner* — Thai Hoang
(74) *Attorney, Agent, or Firm* — Carlson, Gaskey & Olds PC

(57) ABSTRACT

An exemplary method of controlling communications includes determining a total congestion window size for a router device. An allocation of at least a portion of the determined total congestion window size to allocated at least one mobile station that communicates with the router device over a wireless link is determined based on the determined total congestion window size. The determined allocation is then reported to a source of a communication intended for the at least one mobile station.

23 Claims, 1 Drawing Sheet

METHOD OF CONTROLLING CONGESTION FOR WIRELESS COMMUNICATIONS

FIELD OF THE INVENTION

This invention generally relates to communication. More particularly, this invention relates to wireless communications.

DESCRIPTION OF THE RELATED ART

Wireless communication systems are well known and in widespread use. Personal wireless communication devices such as cellular phones, personal digital assistants and notebook computers provide convenient communication abilities under a wide variety of circumstances. For example, many mobile stations are capable of data communications that allow an individual to access the Internet.

One difficulty associated with using mobile stations for internet communications is that the bandwidth and associated rates available for wireless communications typically lag behind those available from wired communication lines. For example, although the aggregated throughput of typical $3^{rd}$ generation cellular networks can reach 4 Mbps, when it is shared by mobile users in a cell, the achievable throughput for each user is much smaller than that typically achievable on a wired network. In most circumstances, the wireless link will present a bottleneck as it is not able to process transmissions at the same rate as the wired link.

As the Internet continues to progress toward becoming a heterogeneous network (i.e., wired and wireless communication links), it becomes increasingly important to address the differences in capacity between wireless and wired communication links. Known congestion control techniques do not provide an adequate solution.

For example, known transport control protocol (TCP) congestion control is based on end-to-end additive increase multiplicative decrease adjustment. That approach does not expect any network-assisted feedback. TCP sources must estimate the available bandwidth from packet loss or retransmission timeout. While this scheme has served its purpose well for wired only Internet, it has problems when used in a heterogeneous network. For example, if the network consists of a high bandwidth wired segment and bottlenecked cellular segments, mismatch between the layer 4 congestion control protocol and the layer 2 scheduling mechanism causes serious queue accumulation at the base station that acts as the interface between the wired and wireless portions of the network. It is important to maintain queue stability in this situation. The media access (MAC) layer scheduler cannot take full advantage of multi-user diversity, which results in system performance degradation.

SUMMARY

An exemplary method of controlling communications includes determining a total congestion window size for a router device. An allocation of at least a portion of the determined total congestion window size allocated to at least one mobile station that communicates with the router device over a wireless link is determined based on the determined total congestion window size. The determined allocation is then reported to a source of a communication intended for the at least one mobile station.

An exemplary router device includes a first communication portion configured to communicate with at least one device over a hardwired connection. A second communication portion is configured to communicate with at least one mobile station over a wireless link. A congestion controller is configured to control congestion at the router device. The congestion controller determines a total congestion window size for the router device and determines an allocation of at least a portion of the determined total congestion window size to at least one mobile station. The congestion controller reports the determined allocation over the hardwired connection to a source of a communication intended for the at least one mobile station.

The various features and advantages of the disclosed example will become apparent to those skilled in the art from the following detailed description. The drawings that accompany the detailed description can be briefly described as follows.

DETAILED DESCRIPTION

Figure 1:
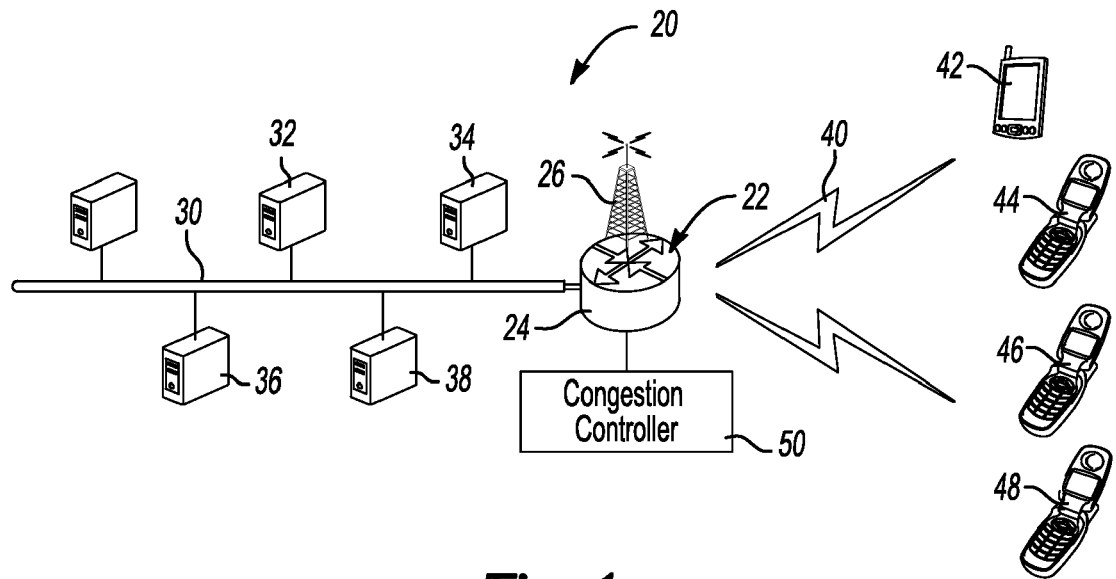
FIG. 1 schematically illustrates selected portions of a wireless communication system.

FIG. 1 schematically shows selected portions of a heterogeneous communication system 20 that is useful for facilitating communications over hardwired connections and wireless communication links. In this example, a router device 22 includes a first portion 24 configured to communicate over a hardwired connection. The router device 22 includes a second portion 26 configured to communicate over at least one wireless link with at least one mobile station. In the illustrated example, the first portion 24 communicates over a hardwired connection 30 with a plurality of server devices 32, 34, 36 and 38. The server devices 32-38 are used for Internet communications, for example. The illustrated example includes wireless links 40 between the second portion 26 and a plurality of mobile stations 42, 4, 46 and 48.

In one example, the router device comprises a base station transceiver capable of conducting wireless communications as used in known cellular networks. The illustrated router device 22 comprises a single base station edge router. The router device 22 in such an example effectively condenses the radio access network into a single network edge element that connects the wired and wireless segments of the example network. The illustrated router device 22 provides layer 3 routing capabilities. Such a flat wireless access network architecture differs from a hierarchical architecture in a known manner. Such an architecture is used in the illustrated example because it is useful for reducing end-to-end latencies and simplifies the complex network structure.

The router device 22 includes a congestion controller 50 that manages the rate of transmissions from the server devices 32-28 to accommodate different bandwidths of the hardwired connection 30 and the wireless links 40. The congestion controller 50 provides information to the server devices 32-38 to control a rate of transmission from the server devices 32-38 to the router device 22.

Figure 2:
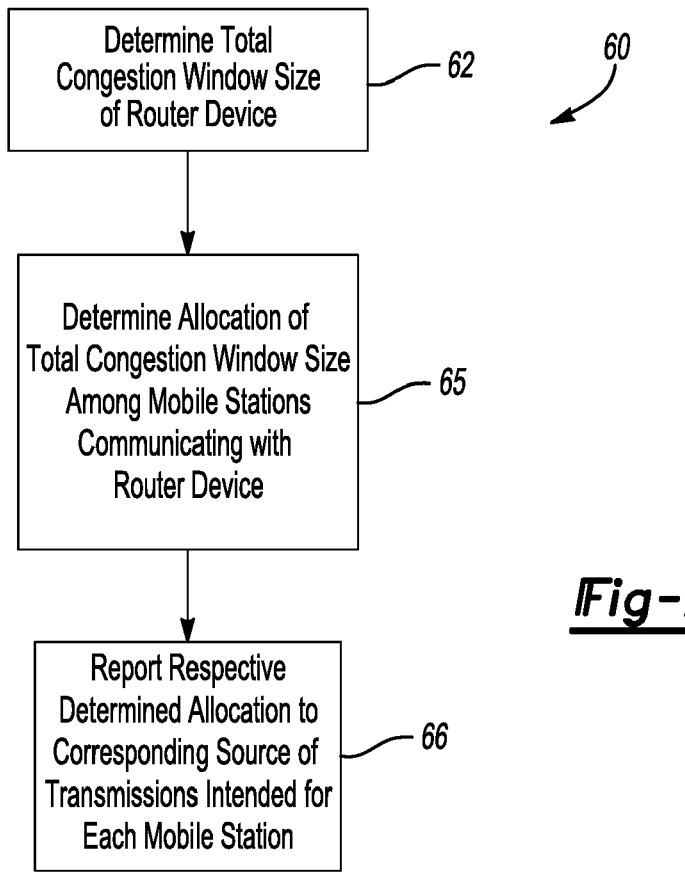
FIG. 2 is a flowchart diagram summarizing one example approach.

One example approach used by the illustrated congestion controller 50 is summarized in the flowchart 60 of FIG. 2. In this example, the congestion controller 50 determines a total congestion window size for the router device 22 at 62. The controller 50 uses the total congestion window size and information regarding the quality of links associated with the various mobile stations 42-48 to determine an allocation of the total congestion window size among the mobile stations 42-48 at 64. One example includes using known techniques for determining a quality of each wireless link (e.g., using available channel condition indicators). At 66, the congestion controller 50 reports respective determined allocations to corresponding ones of the server devices 32-38, which intend to send transmissions to respective mobile stations.

The server devices 32-38, which are the sources of transmissions for the various mobile stations 42-48, adjust their transmission rates responsive to the corresponding reported allocation. In this example, each server device receives a report indicating the window size allocation available to the intended recipient of its transmissions and controls its transmission rate accordingly. This approach minimizes congestion at the router device 22.

In one example, the total congestion window size is based on a measured buffer occupancy at the router device 22. Using a measured queue length or buffer occupancy level is useful for avoiding a more complicated input-output rate measurement, for example.

In one example, the total congestion window size is determined using the following equation $$W(n)=W(n-1)+\alpha\cdot(B-Q(n-1))+\beta\cdot(Q(n-1)-Q(n))$$

wherein W(n) is the total congestion window size, B is a targeted buffer occupancy level at the router device 22, Q(n) is the measured buffer occupancy level at a time n, Q(n−1) is the measured buffer occupancy level at a previous time n−1, and $\alpha$ and $\beta$ are tuning parameters.

In one example, the targeted buffer occupancy level is equal to the average bandwidth-delay product of the wireless link and a Drop tail policy is used.

By recognizing a situation where the router device 22 is receiving transmissions on the wired connection 30 at a faster rate than the router device is sending transmissions on the wireless links 40 (i.e., there is congestion at the router device 22), the buffer occupancy can be controlled to maintain stability. In the above equation, whenever the measured occupancy Q is higher than it was previously (i.e., Q(n)>Q(n−1)), the last term becomes negative, which serves to reduce the total congestion window size.

Choosing the tuning parameters allows for ensuring system stability. For example, choosing the tuning parameters to ensure that the poles of the transfer function locate in the left side of the complex s-plane where the transfer function is $$W(s) = \frac{\left(\frac{T}{2}\right)\left(\frac{2}{T}+s\right)\left[P_1\left(\frac{2}{T}+s\right)^2 + P_2\left(\frac{4}{T^2}-s^2\right) + P_3\left(\frac{2}{T}-s\right)^2\right]}{s(P_4 s^2 + P_5 s + P_6)}$$

where $P_0=(1-\alpha\cdot(B+H_{ave}\cdot T))/\alpha$
$P_1=1+P_0$, $P_2=P_0(\beta-1)$
$P_3=P_0(\alpha-\beta)$, $P_4=(\alpha-2\beta+2)T^2$
$P_5=4(1-\alpha+\beta)T$, $P_6=4\alpha$ and $H_{ave}$ is the average aggregate TCP throughput of the router device 22. One example stable system includes the tuning parameters satisfying the following $$\beta\geq 1, 2(\beta-1)\leq\alpha\leq\beta+1$$

An update rate for updating the total congestion window size in one example is determined based on an average round trip time for TCP packets on the wireless links between the router device 22 and the mobile stations 42-48. For example, the update interval is equal to the difference in time between the times n and n−1 above.

Once the total congestion window size is determined, the congestion controller 50 determines how to allocate that resource among the mobile stations 42-48. One example allocates at least a portion of the available window resource to at least one of the mobile stations based on a quality of the wireless link 40 between the router device 22 and the corresponding mobile station. Each mobile station is allocated an allocation $w_i(n)$ (i=1, 2, ... N) wherein n is the update interval and N is the number of mobile stations actively communicating with the router device 22. In one example, in the MAC layer scheduler uses a proportional fair approach to provide a tradeoff between aggregated throughput efficiency and system fairness. One example includes congestion window allocation in the TCP layer following the proportional fair criterion to coordinate with the MAC layer scheduler. The goal in one example is to have data injected from the higher (TCP) layer into the network at a rate that matches the transmission rate of the MAC layer assigned to the corresponding flow. One way of achieving this goal is to maximize the utility function U(w) of the proportional fair allocation.

For example, the utility function is described by the equation $$U(w) = \sum_{i=1}^{N} \log_2(\bar{R}_i)$$

Maximizing U(w) in one example includes allocating the total congestion window according to $$w_i(n)=[\mu-\tau\cdot\bar{R}_i(n)\cdot T_i(n-1)]^{\dagger}$$

wherein $[X]^{\dagger} \square \max(0,x)$, $\tau$ is an averaging factor, $R_i(n)$ is the moving average of TCP packet throughput of user i measured at the update interval n, $T_i(n-1)$ is the average TCP packet wireless round trip delay of slot n−1 and $\mu$ is the water filling level of a water filling allocation approach.

The maximization target during slot n is $$U(w) = \sum_{i=1}^{N} \log_2(\bar{R}_i(n+1))$$

Using moving average throughput calculation yields $$\bar{R}_i(n+1) = \left(1 - \frac{1}{t_c}\right)\cdot\bar{R}_i(n) + \frac{1}{t_c}\cdot r(n)$$

wherein $t_c$ is the time constant of the averaging window and $r_i(n)=w_i(n)/T_i(n)$ is the TCP packet throughput for slot n. Approximating $T_i(n)$ with $T_i(n-1)$, the maximization problem above can be written as $$\max U(w) = \sum_{i=1}^{N} \log_2\left(\left(1 - \frac{1}{t_c}\right)\cdot\bar{R}_i(n) + \frac{1}{t_c}\cdot w_i(n)/T_i(n-1)\right)$$

subject to $w_i(n) \geq 0 (i = 1, 2, ... N)$ $$\sum_{i=1}^{N} w_i(n) = W(n)$$

Using the Lagrangian, we have $$U(w, \lambda, \mu) = \sum_{i=1}^{N} \log_2\left(\left(1 - \frac{1}{t_c}\right) \cdot \overline{R}_i(n) + \frac{1}{t_c} \cdot w_i(n)/T_i(n-1)\right) + \sum_{i=1}^{N} \lambda_i w_i(n) - \mu\left(\sum_{i=1}^{N} w_i(n) - W(n)\right)$$

According to the Karush-Kuhn-Tucker condition, the necessary condition for optimality is $$\lambda_j \geq 0, \lambda_j w_i(n) = 0$$

$$1/(\tau \cdot \overline{R}_i(n) - T_i(n-1) + w_i(n)) + \lambda_j - \mu = 0$$

$$\tau = t_c - 1$$

Solving for the water filling level μ yields $$\mu = N \bigg/ \left(W(n) + \sum_{i=1}^{N} \tau \cdot \overline{R}_i(n) \cdot T_i(n-1)\right)$$

The individual window allocations are therefore described by $$w_i(n) = 1/\mu - \tau \cdot \overline{R}_i(n) \cdot T_i(n-1)$$

In this example, the allocations for the mobile stations are a function of the average packet throughput $R_i(n)$ on the wireless link during the interval n and the average packet round trip delay $T_i(n-1)$ on the wireless link during the previous update interval and the water filling level μ.

In this example, a water filling allocation technique is used to make the individual mobile station allocations. In this example, $\tau R_i(n) \cdot T_i(n-1)$ corresponds to the ground level, the total congestion window W(n) corresponds to the amount of water that is available and the optimal user congestion window size corresponds to the depth of water above the ground.

Once the allocations are determined, the controller 50 reports these to the corresponding server devices. The allocation report from the controller 50 is intended to match the transmission rate of the server devices 32-38 to the achievable rate the router device MAC scheduler provides the corresponding mobile stations 42-48 according to the determined allocations. In one example, the report comprises and indication in an advertised window field in the header of a TCP acknowledgment segment sent to the server devices 32-38.

The disclosed example facilitates maintaining stability at an edge router device that interfaces between wireless communication links and wired communication lines in a heterogeneous network arrangement. The example control strategy controls transmission rates based on the radio channel capacity of the wireless links to the mobile stations. One feature of the disclosed example is that is does not require changing the TCP protocol so that it can be implemented at appropriate router devices without affecting the operation of the already established Internet network.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:
1. A method of controlling communications, comprising the steps of:
    determining a total congestion window size for a router device;
    determining an allocation of at least a portion of the determined total congestion window size to at least one mobile station that communicates with the router device over a wireless link; and
    reporting the determined allocation over a hardwired communication line to a source of a communication intended for the at least one mobile station.
2. The method of claim 1, comprising
    determining the total congestion window size based on a measured buffer level at the router device.
3. The method of claim 2, comprising
    determining a current buffer occupancy level;
    determining a difference between the current buffer occupancy level and a previously determined buffer occupancy level; and
    adjusting the total congestion window size based on the determined difference.
4. The method of claim 3, comprising
    decreasing a current total congestion window size relative to a previous total congestion window size when the current buffer occupancy level exceeds the previously determined buffer occupancy level.
5. The method of claim 1, comprising
    determining the total congestion window size based on a desired buffer occupancy level at the router device.
6. The method of claim 1, comprising
    updating the determined total congestion window size and the determined allocation at an update rate that is based on an average round trip time of a packet over the wireless link.
7. The method of claim 1, comprising
    determining the allocation based on a proportional fair distribution of the total congestion window size among a plurality of mobile stations communicating with the router device.
8. The method of claim 1, comprising
    determining the allocation based on a quality of the wireless link.
9. The method of claim 8, comprising
    determining the allocation as a function of an average packet throughput on the wireless link and an average packet round trip delay on the wireless link.
10. The method of claim 1, comprising
    reporting the determined allocation as an indication in a header of a transport control protocol acknowledgment from the router device.
11. The method of claim 1, comprising
    communicating between the router device and a plurality of servers over a wired connection;
    communicating between the router device and a plurality of mobile stations over a plurality of wireless links; and
    reporting the determined allocation to the servers such that a server transmission to the router device corresponds to the allocation for a corresponding mobile station intended to receive the transmission.
12. The method of claim 1, comprising
    determining an allocation of at least a portion of the determined total congestion window size to each of a plurality of mobile stations, respectively; and
    reporting the respective determined allocations over the hardwired communication line to a source of a communication intended for each of the mobile stations, respec- tively so that each source responsively transmits a communication intended for one of the mobile stations to the router device using a transmission size corresponding to the reported allocation for the respective mobile station.

13. A router device, comprising:
a first communication portion configured to communicate with at least one device over a hardwired connection;
a second communication portion configured to communicate with at least one mobile station over a wireless link; and
a congestion controller configured to
determine a total congestion window size for the router device;
determine an allocation of at least a portion of the determined total congestion window size to the at least one mobile station; and
report the determined allocation to a source of a communication intended for the at least one mobile station.

14. The router device of claim 13, wherein the controller is configured to determine the total congestion window size based on a measured buffer level at the router device.

15. The router device of claim 14, wherein the controller is configured to
determine a current buffer occupancy level;
determine a difference between the current buffer occupancy level and a previously determined buffer occupancy level; and
adjust the total congestion window size based on the determined difference.

16. The router device of claim 13, wherein the controller is configured to determine the total congestion window size based on a desired buffer occupancy level at the router device.

17. The router device of claim 13, wherein the controller is configured to update the determined total congestion window size and the determined allocation at an update rate that is based on an average round trip time of a packet over the wireless link.

18. The router device of claim 13, wherein the controller is configured to determine the allocation based on a quality of the wireless link.

19. The router device of claim 13, wherein the controller is configured to determine the allocation as a function of an average packet throughput on the wireless link, an average packet round trip delay on the wireless link and a maximum possible allocation per wireless link.

20. The router device of claim 13, wherein the controller transmits a transport control protocol acknowledgment over the hardwired connection and indicates the determined allocation in a header of the transport control protocol acknowledgment.

21. The router device of claim 13, wherein the congestion controller is configured to determine an allocation of at least a portion of the determined total congestion window size to each of a plurality of mobile stations, respectively; and
report the respective determined allocations to a source of a communication intended for each mobile station, respectively.

22. A method of communicating, comprising
transmitting a transmission to a router device at a rate based on a received indication of an available window of an intended recipient of the transmission, wherein the received indication corresponds to a determined allocation of at least a portion of a determined total congestion window size of the router device allocated to an intended mobile station recipient of the transmission; and
controlling a size of the transmission to the router device responsive to the received indication so that the transmission to the router device corresponds to the determined allocation.

23. The method of claim 22, comprising
transmitting a plurality of transmissions to the router device, each of the transmissions being intended for a different mobile station recipient;
controlling a size of each of the plurality of transmissions, respectively, responsive to the received indication that provides information regarding a determined allocation of at least a portion of the determined total congestion window size of the router device allocated to each of the intended mobile station recipients, respectively.

* * * * *